United States Patent
Suzuki et al.

(10) Patent No.: US 10,924,691 B2
(45) Date of Patent: Feb. 16, 2021

(54) CONTROL DEVICE OF MOVABLE TYPE IMAGING DEVICE AND CONTROL METHOD OF MOVABLE TYPE IMAGING DEVICE

(71) Applicant: SONY CORPORATION, Tokyo (JP)

(72) Inventors: Hideyuki Suzuki, Tokyo (JP); Junji Kato, Tokyo (JP); Kei Takahashi, Tokyo (JP); Hisayuki Tateno, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/339,979

(22) PCT Filed: Sep. 19, 2017

(86) PCT No.: PCT/JP2017/033757
§ 371 (c)(1),
(2) Date: Apr. 5, 2019

(87) PCT Pub. No.: WO2018/088037
PCT Pub. Date: May 17, 2018

(65) Prior Publication Data
US 2020/0045239 A1   Feb. 6, 2020

(30) Foreign Application Priority Data

Nov. 14, 2016   (JP) ............................. JP2016-221535

(51) Int. Cl.
*H04N 5/247* (2006.01)
*G03B 15/00* (2021.01)
(Continued)

(52) U.S. Cl.
CPC ............. *H04N 5/247* (2013.01); *G03B 15/00* (2013.01); *H04N 5/232* (2013.01); *H04N 7/181* (2013.01)

(58) Field of Classification Search
CPC ........ G06T 15/10; G03B 13/10; G03B 15/00; G03B 37/04; H04N 5/222; H04N 5/232; H04N 5/247; H04N 7/18; H04N 7/181
(Continued)

(56) References Cited

U.S. PATENT DOCUMENTS 5,495,576 A * 2/1996 Ritchey .................. G06T 17/00
345/420
2017/0026680 A1   1/2017 Sugio et al.

FOREIGN PATENT DOCUMENTS

EP   3133819 A1   2/2017
EP   3229459 A1   10/2017
(Continued)

OTHER PUBLICATIONS

International Search Report and Written Opinion of PCT Application No. PCT/JP2017/033757, dated Nov. 14, 2017, 10 pages of ISRWO.

*Primary Examiner* — Md N Haque
(74) *Attorney, Agent, or Firm* — Chip Law Group

(57) ABSTRACT

[Object] To enable a user to image a free viewpoint video picture easily even in a place where it is difficult to install an imaging device at all times. [Solution] A control device of a movable type imaging device according to the present disclosure includes an imaging information acquiring section that acquires imaging information with regard to imaging from a plurality of movable type imaging devices having an imaging function; and an arrangement information calculating section that calculates arrangement information for arranging a plurality of the movable type imaging devices in order to generate a free viewpoint video picture by synthesizing an image imaged by a plurality of the movable type imaging devices on the basis of the imaging information.

11 Claims, 14 Drawing Sheets

(51) Int. Cl.
*H04N 5/232* (2006.01)
*H04N 7/18* (2006.01)

(58) Field of Classification Search
USPC .................................................... 348/36–61
See application file for complete search history.

(56) References Cited

FOREIGN PATENT DOCUMENTS

| | | |
|---|---|---|
| JP | 2015-204512 A | 11/2015 |
| JP | 2016-005027 A | 1/2016 |
| JP | 2016-010145 A | 1/2016 |
| JP | 2016-171478 A | 9/2016 |
| JP | 2016/171478 A | 9/2016 |
| WO | 2016/088437 A1 | 6/2016 |

\* cited by examiner

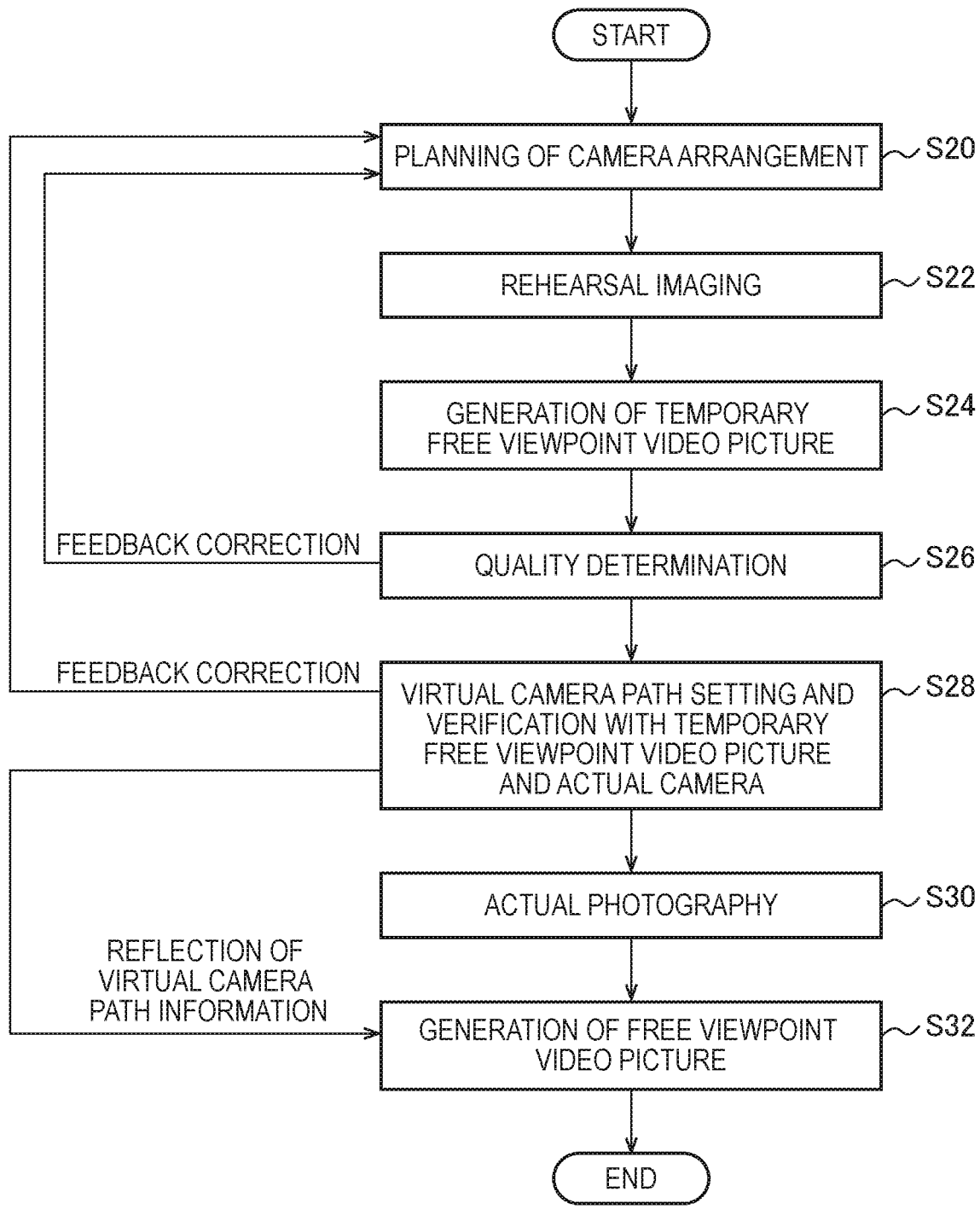

CONTROL DEVICE OF MOVABLE TYPE IMAGING DEVICE AND CONTROL METHOD OF MOVABLE TYPE IMAGING DEVICE

CROSS REFERENCE TO RELATED APPLICATIONS

This application is a U.S. National Phase of International Patent Application No. PCT/JP2017/033757 filed on Sep. 19, 2017, which claims priority benefit of Japanese Patent Application No. JP 2016-221535 filed in the Japan Patent Office on Nov. 14, 2016. Each of the above-referenced applications is hereby incorporated herein by reference in its entirety.

TECHNICAL FIELD

The present disclosure relates to a control device of a movable type imaging device, a control method of a movable type imaging device, and a program.

BACKGROUND ART

Hitherto, for example, as described in Patent Literature 1 described in the below, a technology that has supposed to prevent a dead angle in the case where many cameras have been arranged in a monitoring system, has been known.

CITATION LIST

Patent Literature

Patent Literature 1: JP 2015-204512A

DISCLOSURE OF INVENTION

Technical Problem

The technology described in the above-described Patent Literature 1 is a technology that has supposed to eliminate a dead angle region in a monitoring system. On the other hand, there may be a case where a free viewpoint video picture is generated as a video picture with higher quality than a monitoring camera. In the case of a free viewpoint video picture, not only eliminating a dead angle and occlusion, there are requests peculiar to a free viewpoint video picture, such as preventing cameras from being reflected in each other in the case where the cameras have been arranged over 360 degrees. With the technology of Patent Literature 1 having supposed the monitoring camera, it is difficult to cope with the requests.

Hitherto, at the time of imaging a free viewpoint video picture, a photographic subject has been imaged by using fixed type imaging and sound-collecting devices installed at a site at all times. In the case of using video pictures photographed by the fixed type imaging devices in order to generate a free viewpoint video picture, there is a need to photograph with zooming out in order to put a moving photographic subject within an angle of view. As a result, it has been difficult to generate a free viewpoint image with high definition. Furthermore, in the environment where an imaging device cannot be installed at all times, from the first, a free viewpoint video picture cannot be generated, which has been in a situation unable to respond to a request of a user.

Then, also even in a place where it is difficult to install an imaging device at all times, it has been requested that it is made possible for a user to image a free viewpoint video picture easily.

Solution to Problem

According to the present disclosure, there is provided a control device of a movable type imaging device, including: an imaging information acquiring section that acquires imaging information with regard to imaging from a plurality of movable type imaging devices having an imaging function; and an arrangement information calculating section that calculates arrangement information for arranging a plurality of the movable type imaging devices in order to generate a free viewpoint video picture by synthesizing an image imaged by a plurality of the movable type imaging devices on the basis of the imaging information.

Moreover, according to the present disclosure, there is provided a control method of a movable type imaging device, including: acquiring imaging information with regard to imaging from a plurality of movable type imaging devices having an imaging function; and calculating arrangement information for arranging a plurality of the movable type imaging devices in order to generate a free viewpoint video picture by synthesizing an image imaged by a plurality of the movable type imaging devices on the basis of the imaging information.

Moreover, according to the present disclosure, there is provided a program for making a computer function as: a means for acquiring imaging information with regard to imaging from a plurality of movable type imaging devices having an imaging function; and a means for calculating arrangement information for arranging a plurality of the movable type imaging devices in order to generate a free viewpoint video picture by synthesizing an image imaged by a plurality of the movable type imaging devices on the basis of the imaging information.

Advantageous Effects of Invention

As described in the above, according to the present disclosure, also even in a place where it is difficult to install an imaging device at all times, it becomes possible for a user to image a free viewpoint video picture easily.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 18 is a flowchart showing a processing flow of virtual camera path setting having used a free viewpoint video picture of temporary imaging and verification.

MODE(S) FOR CARRYING OUT THE INVENTION

Figure 1:
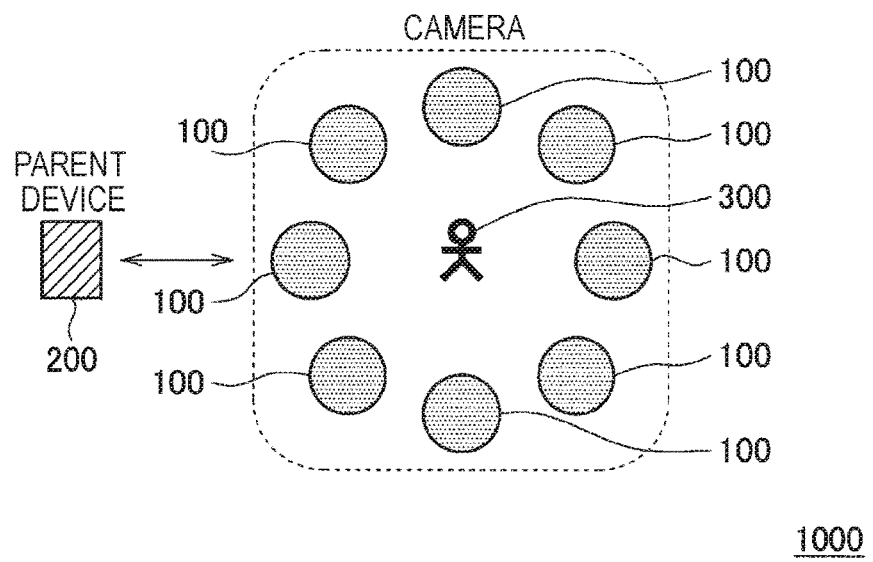
FIG. 1 is a schematic illustration showing a schematic constitution of a system 1000 according to one embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

It should be noted that description shall be given in the following order.
1. Background
2. Constitution example of system
3. Processing performed in system
4. About initial setting
5. About rehearsal imaging
6. About actual imaging
7. Case where photographic subjects separate into two and move 1. Background Generally, at the time of imaging a free viewpoint video picture, the imaging of a photographic subject is performed by using a fixed type imaging device and a sound collecting device and installing them at a site at all times. On the other hand, in the case of a fixed type device, when a photographic subject moves or the like, it is necessary to perform photographing with zooming out. Accordingly, it becomes difficult to generate a free viewpoint image with high definition. In the present embodiment, functions of imaging and sound collecting are mounted on a plurality of portable type imaging devices (drone etc.) having mobility, and are arranged, whereby it is made possible for a user to image a free viewpoint video picture easily even at a place where it is difficult to install an imaging device at all times. Furthermore, in order to attain quality improvement of a free viewpoint video picture in response to requests with regard to the position of a photographic subject changing momentarily, imaging angles, and the like, it is made possible for the plurality of portable type imaging devices to dynamically change their arrangements and the number of them cooperatively.

On the other hand, in users who do not have the installation technique or know-how of an imaging device, there are requests to photograph a free viewpoint video picture easily and to enjoy the video picture. For such a user, from the first, there may be case in which where to install an imaging device may be unknown. Moreover, even if a user has installed an imaging device at a proper position to some extent, unless an actually-synthesized free viewpoint video picture is confirmed, there may be a case in which whether to have installed at a correct position may be unknown. Furthermore, in the case of having given portability to an imaging device and a sound collecting device, the position and attitude of the imaging device and the sound collecting device will always change, which may influence the quality of a generated free viewpoint video picture. The present embodiment is intended to solve these subjects and to provide a system with high convenience.

2. Constitution Example of System First, with reference to FIG. 1, a schematic constitution of a system 1000 according to one embodiment of the present disclosure is described. As shown in FIG. 1, the system 1000 according to the present embodiment includes a portable type imaging device (movable type imaging device) 100 and a parent device 200. In the system 1000 according to the present embodiment, a photographic subject 300 being moving is tracked continuously with the portable type imaging device 100. For this reason, it is desirable to constitute an imaging device group with a wireless network instead of a wired network limited in terms of a distance of a cable.

In the system 1000 according to the present embodiment, a user forms a network group with a plurality of portable type imaging devices 100 and designates a photographic subject imaging mode (photography condition) for the portable type imaging devices 100. Thereafter, the portable type imaging devices 100 are temporarily arranged on the basis of the position information of each of the portable type imaging devices 100 and the photographic subject imaging mode designated by the user, and a free viewpoint video picture is generated in a rehearsal, whereby prior confirmation is performed. Then, from the result of the rehearsal, it is made possible to image with installing the portable type imaging devices 100 at positions with less occlusion. The photographic subject imaging mode is a photography condition including conditions with regard to a photographic subject and conditions with regard to photography.

The designation with regard to the photographic subject imaging mode etc. and the other operations by a user can be performed through the parent device 200. On the other hand, the user can also perform these operations by operating the portable type imaging device 100 directly.

Figure 2:
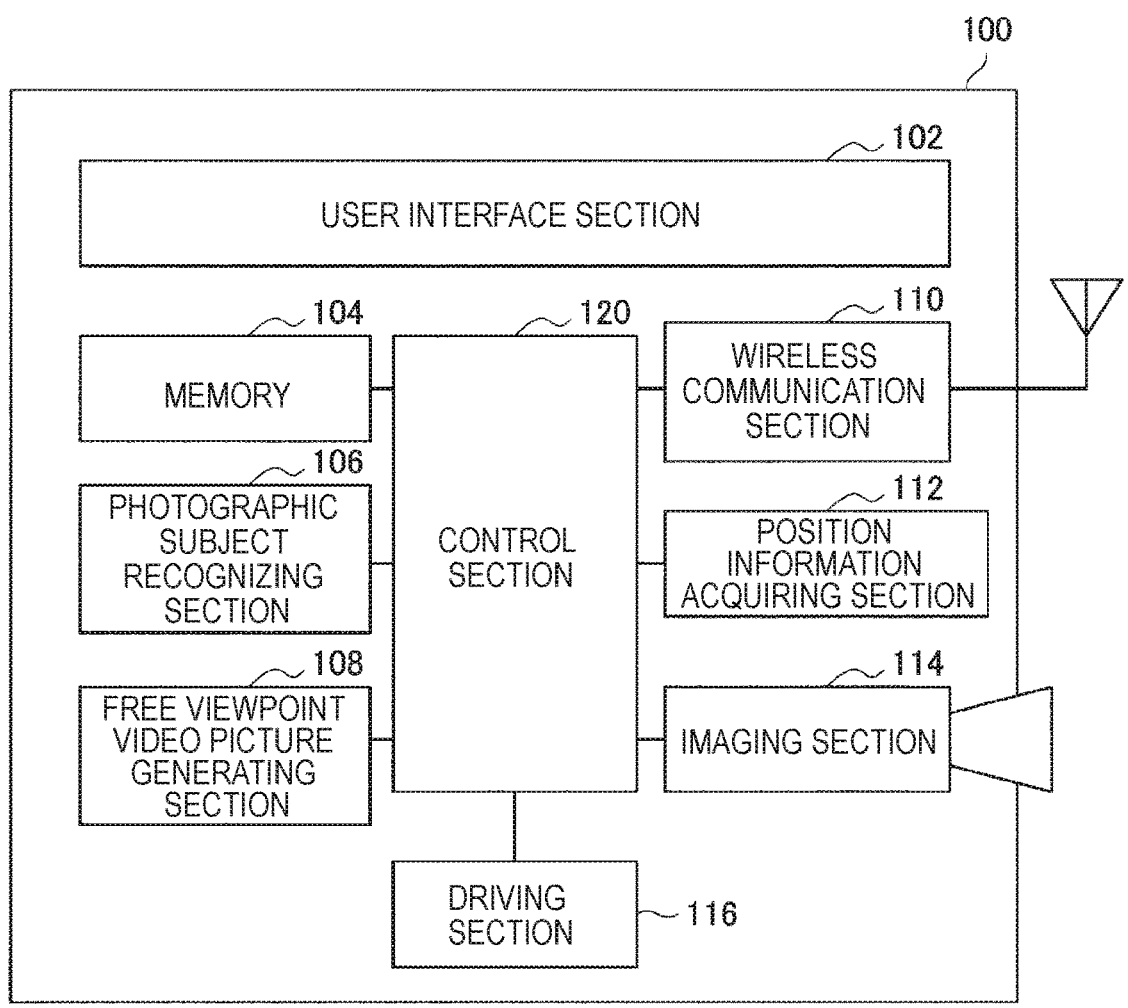
FIG. 2 is a schematic diagram showing a constitution of a portable type imaging device.

FIG. 2 is a schematic diagram showing a constitution of the portable type imaging device 100. As a form of the portable type imaging device 100, it may be UAV (Unmanned Aerial Vehicle; for example, drone). In this case, it is possible for the UAV to automatically move with time, and it is also possible to recognize a target designated beforehand and to track it. The locus of the UAV may be controlled automatically or may be caused to be able to be set by the user in advance in a form like a time line. The user may set the movement of a part of the UAVs, and then, the other UAVs may decide courses automatically so as to make a dead angle after the synthesis small and may perform photography.

As shown in FIG. 2, the portable type imaging device 100 includes a user interface (UI) section 102, a memory 104, a photographic subject recognizing section 106, a free viewpoint video picture generating section 108, a wireless communication section 110, a position information acquiring section 112, an imaging section 114, a driving section 116, and a control section 120. In this connection, it is assumed that the portable type imaging device 100 supports an imaging function for a free viewpoint video picture defined in the present embodiment.

In FIG. 2, the imaging section 114 includes an image sensor, such as a CMOS sensor. The imaging section 114 may include an optical lens for making a photographic subject image form on an imaging surface of the image sensor. The user interface section 102 is a constitution element into which an operation by a user is input, and includes a touch panel, an operation button, and so on. The memory 104 is a recording medium that stores image information that the imaging section 114 has imaged and various kinds of the other information. The photographic subject recognizing section 106 recognizes a photographic subject from the image information that the imaging section 114 has imaged, and extracts the information showing the feature of the photographic subject, the position information of the photographic subject, and so one.

The wireless communication section 110 is a constituent element that has a function of performing wireless communication with the other portable type imaging devices 100 or the parent device 200. As a method of the wireless communication, Bluetooth (registered trademark) etc. are cited. However, the method is not limited to this specifically.

The free viewpoint video picture generating section 108 generates a free viewpoint video picture by acquiring the image information imaged by the other portable type imaging devices 100 through communication with the other portable type imaging devices 100 and by synthesizing the images. As shown in FIG. 1, each of the plurality of portable type imaging devices 100 photographs one photographic subject from a different direction. The free viewpoint video picture generating section 108 combines images photographed from many directions so as to generate a three-dimensional model, thereby generating a free viewpoint video picture. With a matter that each of the portable type imaging devices 100 includes the free viewpoint video picture generating section 108, each of the portable type imaging devices 100 can share the images photographed by all the portable type imaging devices 100 and can generate a free viewpoint video picture.

The position information acquiring section 112 acquires the position information with regard to the portable type imaging devices 100 by the function of GPS. Each of the portable type imaging devices 100 shares the position information with regard to all the portable type imaging devices 100 through the wireless communication. The driving section 116 drives wheels, propeller, etc. for moving the portable type imaging device 100. The control section 120 controls each of the constitution elements of the portable type imaging device 100.

Figure 3:
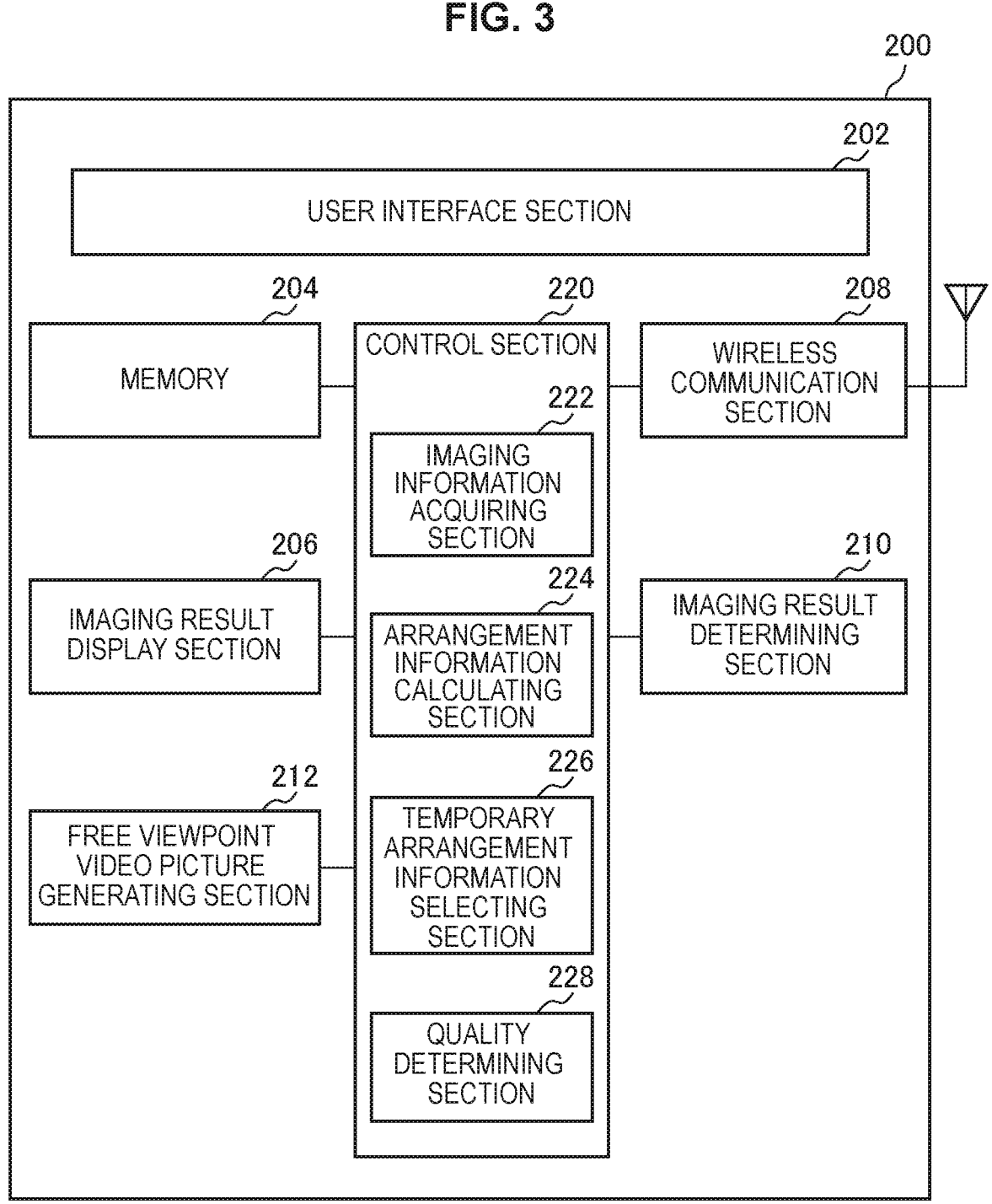
FIG. 3 is a schematic diagram showing a constitution of a parent device.

FIG. 3 is a schematic diagram showing a constitution of the parent device 200. The parent device 200 is, for example, a smart phone, a tablet terminal, HMD, or the like, and is a terminal on which a display is mounted. In the present embodiment, free viewpoint video pictures are temporarily generated successively by the parent device 200 at a user's hand, and the arrangement of the portable type imaging devices 100 is adjusted while confirming its accuracy. The parent device 200 includes a user interface (UI) section 202, a memory 204, an imaging result display section (presenting section) 206, a wireless communication section 208, an imaging result determining section 210, a free viewpoint video picture generating section 212, and a control section 220. In this connection, each of the constitution elements shown in FIG. 2 and FIG. 3 can be constituted by a central processing unit, such as hardware or a CPU, and a program (software) for making this function. Moreover, the program may be recorded in a recording media, such as a memory equipped in the portable type imaging device 100 or the parent device 200.

The user interface section 202 is a constitution element into which an operation by a user is input, and includes a touch panel, an operation button, and so on. The memory 204 is a recording medium that stores the image information of free viewpoint images acquired from each of the portable type imaging devices 100 and various kinds of the other information. The imaging result display section 206 includes a liquid crystal display device (LCD) and the like and displays a generated free viewpoint image. Moreover, the imaging result display section 206 presents arrangement information for arranging the plurality of portable type imaging devices 100 at the optimal positions to a user. In the case where the portable type imaging device 100 is not a self-propelled device, such as a drone, the user can arrange the plurality of portable type imaging devices 100 at the optimal positions on the basis of the presented arrangement information.

The wireless communication section 208 is a constituent element that has a function of performing wireless communication with each of the portable type imaging devices 100. The wireless communication section 208 acquires the image information imaged by each of the portable type imaging devices 100 through the communication with each of the portable type imaging devices 100. As mentioned in the above, a method of wireless communication is not limited specifically. The imaging result determining section 210 determines on the basis of a generated free viewpoint image whether occlusion and the like have occurred in an image. The free viewpoint video picture generating section 212 generates a free viewpoint video picture by synthesizing images imaged by each of the portable type imaging devices 100.

The control section 220 controls each of the constitution elements of the parent device 200. The control section 220 includes an imaging information acquiring section 222, an arrangement information calculating section 224, a temporary arrangement information selecting section 226, and a quality determining section 228. The imaging information acquiring section 222 acquires information with regard to imaging that the plurality of portable type imaging devices 100 has. The arrangement information calculating section 224 calculates, on the basis of the information with regard to imaging, the arrangement information for arranging the plurality of portable type imaging devices 100 at the optimal positions, in order to generate a free viewpoint video picture by synthesizing images imaged by the plurality of portable type imaging devices 100. Moreover, the arrangement information calculating section 224 calculates the arrangement information on the basis of the quality of a free viewpoint video picture, and, in particular, calculates the arrangement information for arranging the plurality of portable type imaging devices 100 at the optimal positions on the basis of a free viewpoint video picture generated in a state where the plurality of portable type imaging devices 100 is temporarily arranged. The temporary arrangement information selecting section 226 selects the temporary arrangement information corresponding to a photography condition in response to an operation input of a user. The quality determining section 228 determines, on the basis of the determination result of the imaging result determining section 210, the quality of a free viewpoint video picture, such as whether a dead angle or occlusion has occurred in the free viewpoint video picture or not.

3. Processing Performed in System

Figure 4:
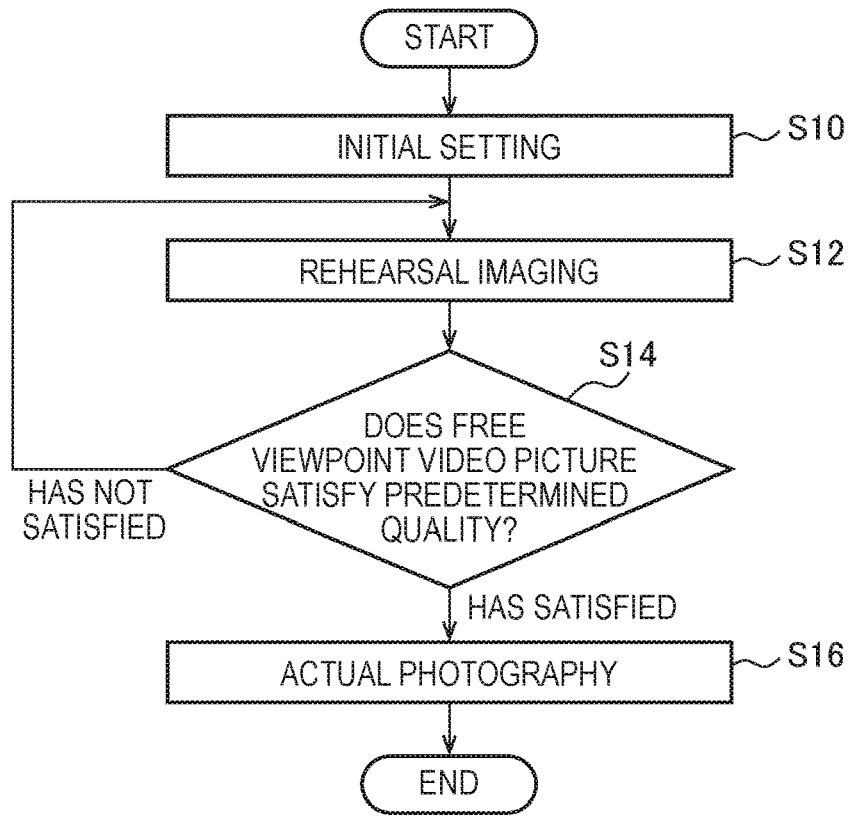
FIG. 4 is a flowchart showing overall processing performed in a system according to the present embodiment.

FIG. 4 is a flowchart showing the overall processing performed in the system according to the present embodiment. On the basis of FIG. 4, functions provided by the present system are described in a time series as an operation sequence from the initial setting to finally generating a free viewpoint video picture. First, in Step S10, the initial setting is performed by the parent device 200. In concrete terms, in Step S10, performed are the initial setting of a network group including the plurality of portable type imaging devices 100 and the setting of time synchronization and a photographic subject imaging mode. Moreover, by an operation of a user, a plurality of portable type imaging devices 100 belonging to the same group is selected, and a network group is formed. Furthermore, environment recognition is performed, and the parent device 200 acquires the performance of a camera, imaging accuracy, position information, and the like about each of the plurality of portable type imaging devices 100 belonging to the same group.

Next, in Step S12, rehearsal imaging is performed. In concrete terms, on the basis of the position information with regard to the portable type imaging devices 100 and the photographic subject imaging mode set by the user, the plurality of portable type imaging devices 100 is temporarily arranged, and a free viewpoint video picture is temporarily generated by synthesizing images acquired from the plurality of portable type imaging devices 100. With this, a trial photography can be performed, and photography conditions, such as an angle of view of the portable type imaging device 100 can be confirmed. Moreover, the depth of a photographic subject is acquired from the image obtained by the rehearsal imaging, and an obstacle can be detected.

Next, in Step S14, determined is whether the free viewpoint video picture temporarily generated by the rehearsal imaging satisfies a predetermined quality or not, and then, in the case of having satisfied the predetermined quality, the processing proceeds to Step S16. In Step S16, an actual photography is performed. In concrete terms, in Step S16, the fine adjustment of the arrangement of the portable type imaging devices 100 is performed from the temporarily-generated free viewpoint video picture, and then, an actual imaging is executed. At this time, the fine adjustment of the arrangement is performed by instructing the user to rearrange the portable type imaging devices 100, and then, the actual imaging is started.

4. About Initial Setting

In the below, each of the processes in FIG. 4 is described in detail. First, the initial setting performed in Step S10 is described. In the initial setting, the network initial setting of the portable type imaging devices 100 and the setting of time synchronization and a photographic subject imaging mode are performed. The initial setting of the portable type imaging devices 100 and the grouping are realized by the interaction with the user. First, the user turns on the power source of each of the parent device 200 and the portable type imaging devices 100. Upon turning on the power source, the portable type imaging device 100 performs an operation to notify the circumference that the imaging function of a free viewpoint video picture is supported. As a concrete method, used is a method of exchanging the service information and the connection protocol (supports Wi-Fi Direct/IEEE-802.11s mesh) to which the portable type imaging devices 100 correspond, by using IEEE-802.11 Management Frame before connecting with the parent device 200.

Figure 5:
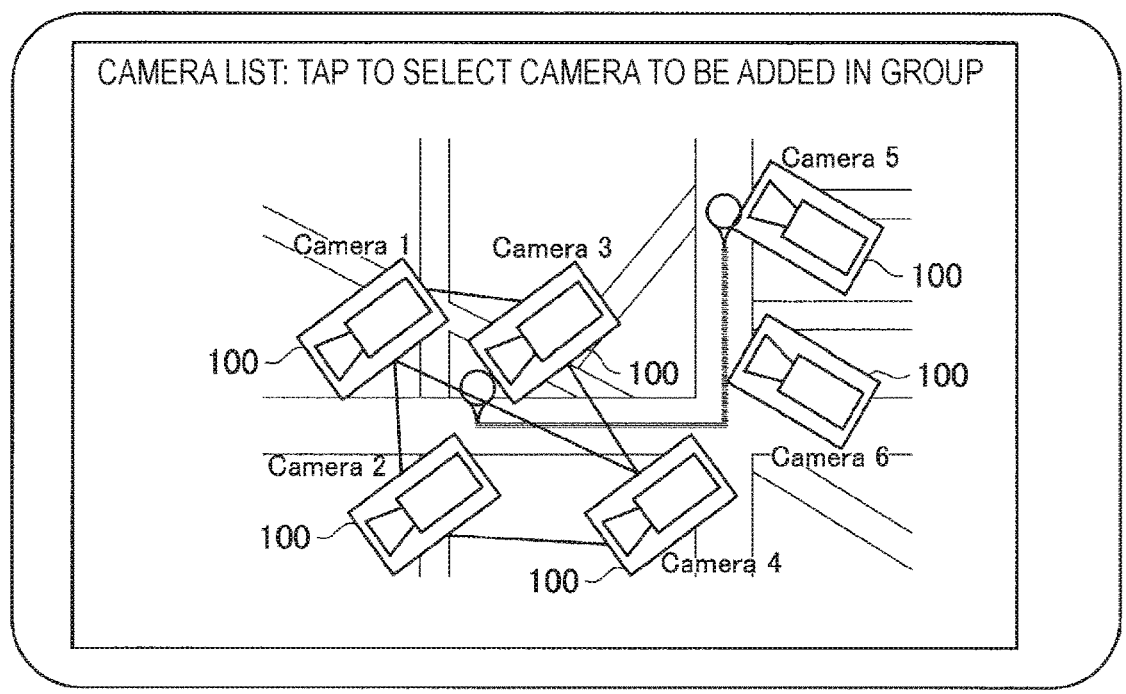
FIG. 5 is a schematic illustration showing a state where a plurality of portable type imaging devices being coping with the imaging of a free viewpoint video picture is displayed on a screen of a parent device.

The parent device 200 recognizes the portable type imaging devices 100 corresponding to the imaging of a free viewpoint video picture from the information notified from the portable type imaging devices 100 and makes them candidates of the devices to be registered in a group in the following steps. FIG. 5 is a schematic diagram showing a state where a plurality of portable type imaging devices 100 corresponding to the imaging of a free viewpoint video picture is displayed on the imaging result display section 206 of the parent device 200. As shown in FIG. 5, the parent device 200 presents the user the portable type imaging devices 100 becoming connection candidates and asks the user to select. Moreover, in the case where there exists a plurality of groups, the parent device 200 presents the candidates of a group with regard to whether to add the selected portable type imaging device 100 to which group, ask the user to select, and determines the grouping.

In the case of adding the portable type imaging device 100 to the group, there may be a case where it is troublesome to set in advance how many portable type imaging devices 100 and how to make them finally cooperate with each other. For this reason, a method of sequentially adding the portable type imaging device 100 to a group may be taken in such a way that, when the power source of the portable type imaging device 100 is newly turned on, a message, such as "add to the existing group?" may be displayed on the user interface section 202 of the parent device 200. In this case, the user can constitute a group easily, without taking a care beforehand about how to constitute a group with how many portable type imaging devices 100. In this connection, in the case of taking this method, and in the case where there is a plurality of groups, there arises a necessity to discriminate whether to add the portable type imaging device 100 into which one of the groups. Moreover, also from a viewpoint of security, there may be a case where it may not be desirable that the portable type imaging device 100 of the other person is added to the same group. For this reason, the connection setting of the portable type imaging device 100 and the parent device 200 is performed by causing tags, such as a two-dimensional bar code of the parent device 200 in which security information is written, to be read in by using the camera of the portable type imaging device 100. Alternatively, by touching the portable type imaging device 100 with the parent device 200 by using a proximity communication device, such as an NFC, a connection partner may be specified, and a group may be discriminated. A fixed installation type imaging device may be incorporated in the group. Moreover, the portable type imaging device 100 or the fixed installation type imaging device may include a depth camera with which the depth is known.

In this connection, in the middle of performing the connection procedure, a virtual wire can also be displayed on the screen of the parent device 200 with being pulled between cameras.

Figure 6:
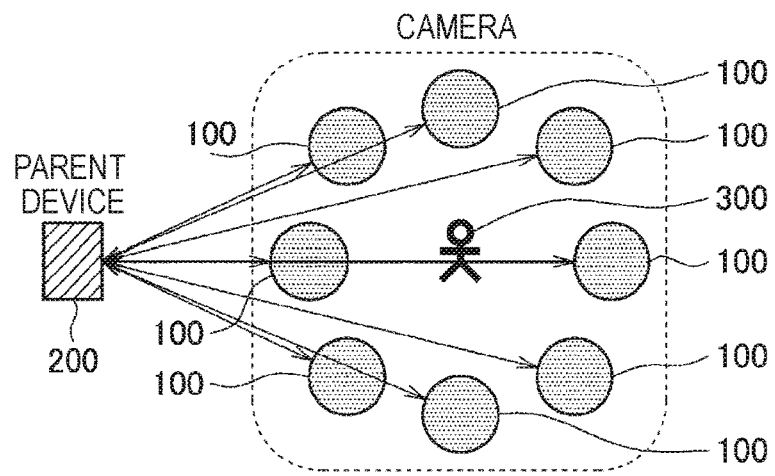
FIG. 6 is a schematic illustration showing a state where connection between a parent device and portable type imaging devices registered in a group has been completed.
Figure 7:
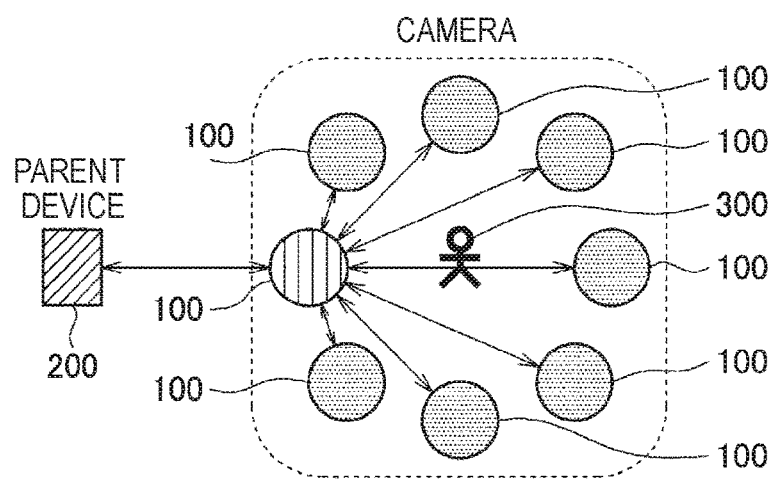
FIG. 7 is a schematic illustration showing a state where one portable type imaging device in a grouping becomes a master camera, establishes communication connection with other cameras (slave) via Wi-Fi Direct, and establishes communication with a parent device via Wi-Fi Direct.

At this time point, as shown in FIG. 6, the parent device 200 and the portable type imaging device 100 being registered in the group become a state where the connection has been completed. The protocol used for connection supposes Wi-Fi Direct in which the parent device 200 is made Group Owner or an infrastructure mode in which the parent device 200 is made SoftAP. The temporary imaging of a free viewpoint video picture may be performed as it is. However, in this case, as a result of a matter that a moving photographic subject is tracked and photographed, a plurality of portable type imaging devices 100 moves out of the radio wave reachable range of the parent device 200. Accordingly, it is supposed that a network group does not function. In the case of a use case in which such a situation can be considered, as shown in FIG. 7, one portable type imaging device 100 in the grouping becomes a master camera, establishes communication connection with other cameras (slave) via Wi-Fi Direct, and establishes communication with the parent device 200 via Wi-Fi Direct.

Figure 8:
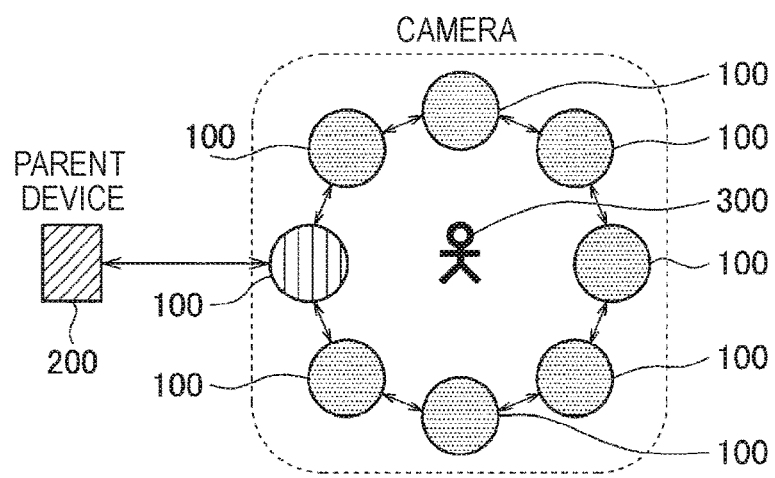
FIG. 8 is a schematic illustration showing a state where one portable type imaging device in a grouping becomes a master camera, establishes communication connection with other cameras (slave) via Mesh, and establishes communication with a parent device via Wi-Fi Direct or Mesh.

Alternatively, as shown in FIG. 8, one portable type imaging device 100 in the grouping becomes a master camera, may establish communication connection with other cameras (slave) via Mesh, and may establish communication with the parent device 200 via Wi-Fi Direct or Mesh.

With this, even if the group of the portable type imaging devices 100 separates from the parent device 200, it becomes possible to continue the imaging of a free viewpoint video picture. For this reason, it is made possible for a user to image by selecting whether to constitute a network group so as to center on the parent device 200, or to constitute a network group only with the portable type imaging devices 100. In the case of constituting a network group only with the portable type imaging devices 100, upon selecting a portable type imaging device 100 becoming a master camera from the portable type imaging devices 100 in the group by user, a Wi-Fi Direct group or a mesh network in which the master camera is made a Group Owner, is formed automatically again.

In this connection, in this way, in the case where a network group is constituted among the portable type imaging devices 100, for clock synchronization among the devices, by using techniques, such as IEEE 802. 11mc Fine Timing Measurement that is a hardware support type PTP protocol on wireless LAN, it is possible to perform the clock synchronization among the imaging devices with higher precision.

Figure 9:
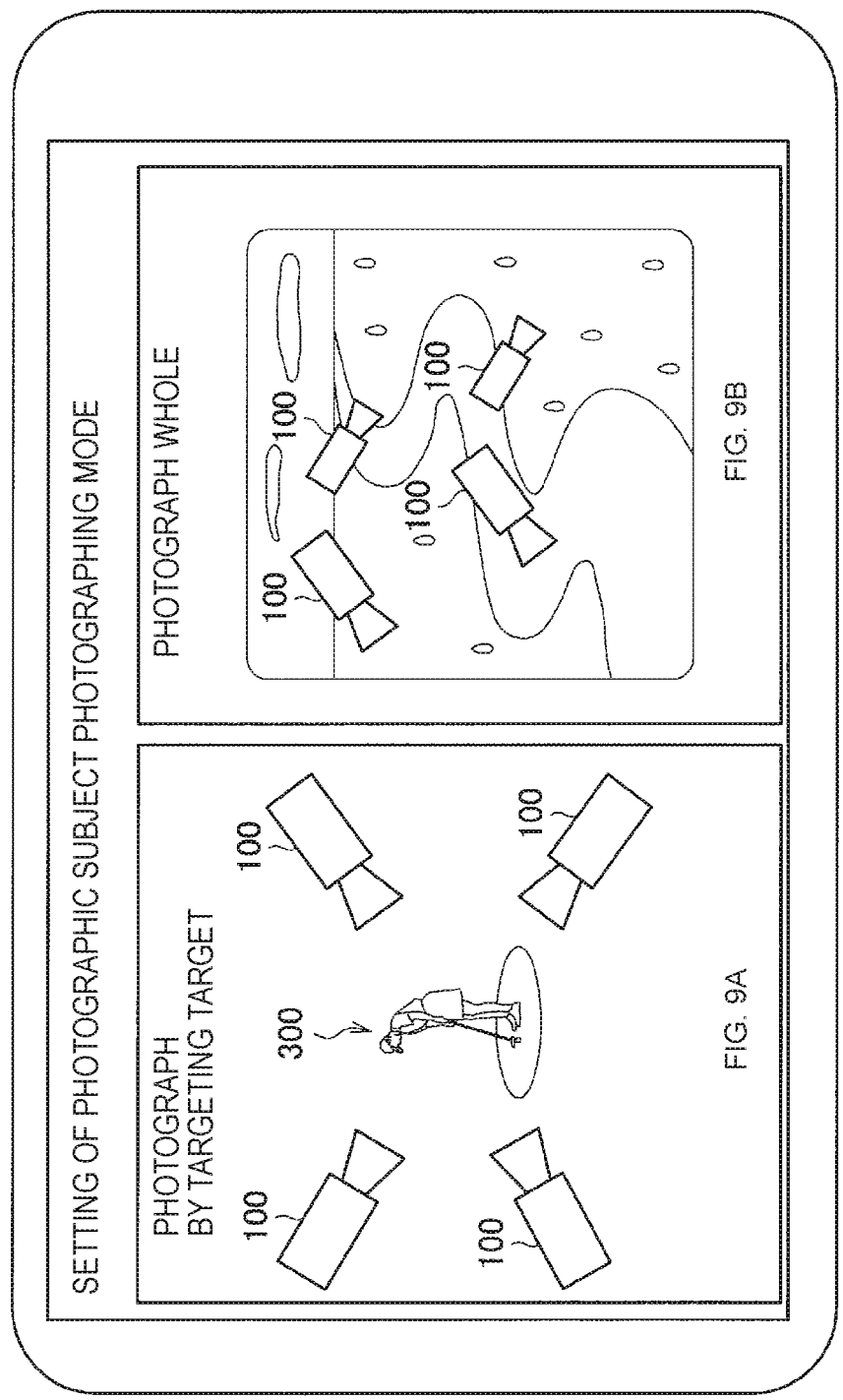
FIGS. 9A and 9B are schematic illustrations showing a situation of selecting the settings of a photographic subject imaging mode.

After the portable type imaging device 100 group has been formed, the user selects the setting of a photographic subject imaging mode by using the parent device 200. FIGS. 9A and 9B are schematic diagrams showing a situation of selecting the setting of a photographic subject imaging mode. In here, first, it is set whether an imaging object is the whole-sky/all-circumference or a free viewpoint photography, and further, it is set whether the portable type imaging devices 100 are arranged on the basis of what kind of imaging policies. In the photographic subject imaging mode, it has been made possible for a user to select and set a desired mode from a plurality of imaging modes. For example, as shown in FIGS. 9A and 9B, by selecting the photographic subject imaging mode, it is possible to designate whether to image with aiming an object by arranging the portable type imaging devices 100 uniformly over 360 degrees around the photographic subject 300, or whether to image the whole by imaging a scene etc. from a plurality of directions with making the imaging directions of the plurality of portable type imaging devices 100 a radial form. Moreover, in the case of having supposed a use in a concert stage etc., the user can designate also a photographic subject imaging mode in which a large number of portable type imaging devices 100 are arranged on the front side than the back side of a photographic subject, and so on.

For example, a setting for tracking a specific object and a case of acquiring a video picture of the entire celestial sphere from a certain spot, may be considered. Alternatively, a special setting, such as photographing a player intensively with targeting a moment of having hit to a racket in the case of tennis, may be also considered. In this case, a system may recommend a photographing manner to the user by recognizing the type of sport, the position of an object, a situation, and so on. Alternatively, the user may input an already-photographed moving image into a system, and a system may estimate a policy on the basis of this. The information with regard to these photographic subject imaging modes and policies can be stored in the memory 204 of the parent device 200 beforehand.

Figure 10:
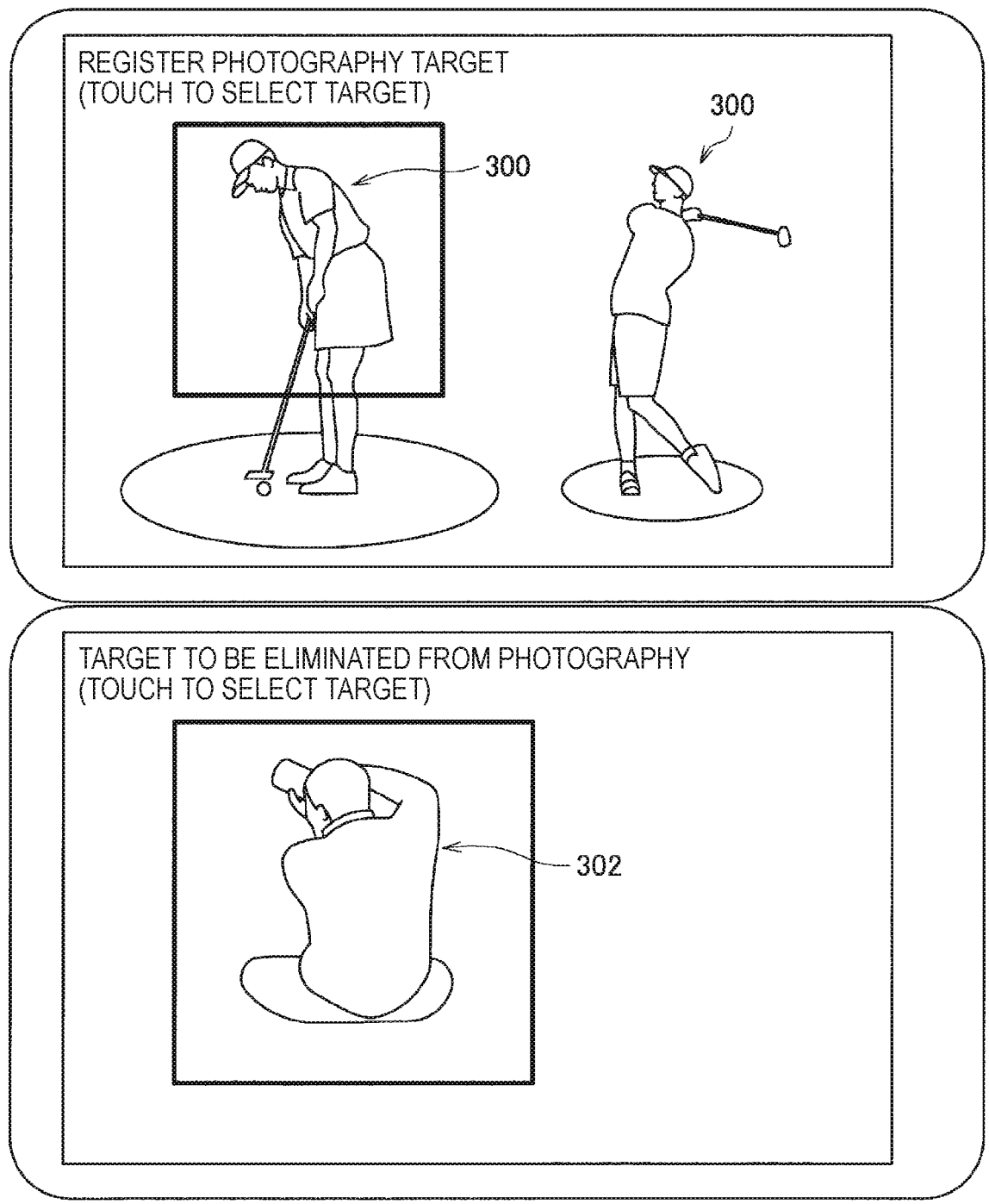
FIG. 10 is a schematic illustration showing an example of causing tracking to be performed with an image feature by inputting a photograph of a photographic subject becoming a target, a photograph with a depth, or an object person that one wants to track with a voice, in advance.

Moreover, in the case of a setting of targeting a photographic subject, there may be a case where it is difficult to designate a photographic subject before photographing. In that case, a technique of attaching a marker to a photographic subject and performing marker tracking during photographing, may be used. The tracking is performed in such a way that the photographic subject recognizing section 106 recognizes the marker and the control section 120 drives the driving section 116 so as to track the marker. In the case where it takes time and effort to set a marker, as shown in FIG. 10, by inputting a photograph of a photographic subject becoming a target, a photograph with depth, or an object person that one wants to track with voice in advance, tracking by an image feature may be caused to be performed. In this case, the tracking is performed in such a way that the photographic subject recognizing section 106 recognizes an image feature and the control section 120 drives the driving section 116 so as to track a photographic subject 300 coinciding with the image feature. Moreover, the control section 120 drives the driving section 116 on the basis of the arrangement information sent from the parent device 200, whereby each of the portable type imaging devices 100 is arranged at an optimal position while tracking the photographic subject such that the quality of a free viewpoint video picture becomes high. Moreover, in the case where each of the portable type imaging devices 100 includes a constitution corresponding to the imaging result determining section 210, the quality determining section 228, and the arrangement information calculating section 224 of the parent device 200, each of the portable type imaging devices 100 can be autonomously arranged at an optimum position so as to increase the quality of a free viewpoint video picture while tracking the photographic subject.

In an example shown in FIG. 10, shown is an example where an image of a photograph of a golfer has been registered as an object person that one wants to track and a camera crew has been eliminated from a photography object. By registering with touching the upper half body of the object person that one wants to track, the object person can be registered more correctly. Moreover, simultaneously, by inputting also an object person 302 who is, like a camera crew, not a target and is not to be photographed, it is possible to select a person or object not to be photographed with priority. Moreover, in the case where the user wants to select a plurality of photographic subjects that the user wants to photograph, it is possible to set the plurality of photographic subjects by repeating the above-described photographic subject selecting method. In this case, a plurality of groupings will be made.

5. About Rehearsal Imaging

Next, rehearsal imaging performed in Step S12 in FIG. 4 will be described. In the rehearsal imaging, temporary imaging (rehearsal imaging) is performed by temporarily arranging the portable type imaging devices 100 on the basis of position information and the photographic subject imaging mode set by the user. In the case where a plurality of portable type imaging devices 100 to be used for photography in Step S10 has been connected and the setting of the photographic subject imaging mode has been completed, after the portable type imaging devices 100 have been arranged temporarily, a trial photography and the confirmation of an angle of view are performed. First, in order to perform optimal arrangement, position estimation of each of the portable type imaging devices 100 is performed. Furthermore, information such as the camera performances (specifications), an absolute position, a relative position, the orientation of the camera, and the like of each of the portable type imaging devices 100, is acquired through wireless communication media, and is used as determination materials (imaging information) for an imaging arrangement. In order to specify the position of each of the portable type imaging devices 100, image information may be used also. In concrete terms, a three-dimensional environment map is prepared in each of the portable type imaging devices 100 so as to estimate a self-position and to grasp a relative position with the other portable type imaging devices 100 and is used as imaging information. The three-dimensional environment map is an environmental map that is created from a camera image and includes geometric features, such as the position, information, and the like of an obstacle. By using this environmental map, the self-position estimation of the portable type imaging device 100 can be performed.

Thereafter, the three-dimensional environment map and position information are shared among the portable type imaging devices 100, and the mutual positional relationship is grasped. Alternatively, used may be simultaneously indoor positioning techniques, such as RTK positioning, positioning by wireless LAN IEEE-802.11v or 802.11az, and Bluetooth Low Energy Direction Finding positioning.

After having estimated the position of each of the portable type imaging devices 100, temporary arrangement is performed such that each of the portable type imaging devices 100 becomes an optimal arrangement. After having performed the temporary arrangement, a free viewpoint video picture is imaged in advance, and the quality of the free viewpoint video picture is confirmed. At the time of confirming the quality as to whether the optimal arrangement has been made or not, for example, a place where occlusion is occurring, and the like are confirmed. Whether there is a "hole" that is leaking from an angle of view at the time of photographing a free viewpoint video picture, is checked, and the preparation to cause the portable type imaging devices 100 to be rearranged at the necessary place is made. In addition to a viewpoint as to whether or not occlusion is actually occurring, consideration is given to also the possibility of latent occlusion. For example, in the case where one portable type imaging device 100 has been covered with a moving object, whether occlusion occurs or not is simulated.

Moreover, whether a more important photographic subject as an object has been photographed with sufficient resolution, is confirmed. For example, in sports, it is necessary to photograph main players with sufficient resolution, than a matter that all the objects, such as facilities in a stadium are photographed without occlusion. In order to photograph with sufficient resolution, since it is necessary to narrow the angle of view of a camera and to photograph a photographic subject with the entire screen, it becomes necessary to arrange more cameras around the photographic subject. Moreover, in another example, an angular velocity with which the portable type imaging device 100 can move is taken into consideration. In the case where there exists the portable type imaging device 100 that tracks a specific moving photographic subject, for example, a runner, a ball, a car, an airplane, and so on, a speed at which the portable type imaging device 100 can move is limited. In that case, there is a need that the portable type imaging device 100 separate from the moving photographic subject with a certain amount of distance. In a rehearsal, what kind of video pictures can actually be photographed, is confirmed, and then, problems are made to appear.

In this connection, even if there is a "hole" of occlusion, it is permissible if there is no problem in an angle of view in a free viewpoint video picture finally generated. For this reason, a viewpoint wanted to see on a terminal such as the parent device 200 is input in advance, and the viewpoint wanted to see may be confirmed by going back and forth in the real world. In the case of performing the confirmation in the real world, only a portion becoming a "hole" may be made blackout by using an HMD display or the like. Instead of the HMD display, by displaying a camera through image of a tablet terminal on a screen, the similar thing may be performed.

Next, acquisition of depth information and detection of an obstacle are performed. This is a work that makes a depth map of a photography place. By making a depth map once, a free viewpoint video picture can be made more broadly. On the other hand, there may be a case where a temporary "hole" exists due to obstacle on the way and a depth may not be made. In this case, in order to supplement data necessary for taking depth accurately, it may be permissible to instruct a user to move with having a camera. Alternately, information recorded beforehand on the Internet or in a storage may be referred. Upon taking depth information, a place where a camera is to be currently placed in a 3D space with recognizing an obstacle, is presented. Although a not-moving thing such as a pillar as an obstacle becomes a dead angle even in the actual case, there may be case where occlusion due to an object placed temporarily may not become a problem. For this reason, object recognition is performed, things actually becoming a dead angle at the time of photography are detected, and then, objects are displayed on a screen so as to make it possible to select an obstacle. Moreover, even if there is no problem in a trial photography, there may be a possibility that another occlusion element may come out in an actual photography. In order to solve this, it may be made possible for a user to set arrangement of people or things on the map of the parent device 200. For example, in the photography on a stage, it is made possible to set by dragging the standing position of an artist to a three-dimensional model.

After the temporary arrangement has been completed, a free viewpoint video picture is generated by using the plurality of portable type imaging devices 100. The video pictures from the plurality of portable type imaging devices 100 having imaged may be combined and reconstructed on the master camera, or, in the case where a resource is limited due to battery drive etc., may be processed once in a remote server.

Moreover, after having performed the actual imaging, by moving a video picture having been rendered with making a free viewpoint video picture space reconstituted by the rehearsal an equal size or a miniature, along a camera work at the time of actually viewing and listening by using one camera capable of estimating a self-position, and by performing a zoom operation, a focus operation, an aperture operation, and the like, it becomes possible to confirm the movement path of a virtual camera and a visual effect at the time of viewing and listening a free viewpoint video picture having been subjected to an actual photography, in advance at the stage of the temporary imaging. By moving or operating a physical camera, it becomes possible to confirm intuitively or instruct this flow, for example, to confirm whether occlusion has occurred with viewing from an important angle, to confirm a visual effect in advance by superimposing on a three-dimensional model, or to edit a movement path of a virtual camera. Moreover, by feeding back a movement path of such a virtual camera to a device arrangement in advance, it also becomes possible to set more correctly an object and an area for which quality is to be deemed important.

In the below, one example of an implementation flow of a rehearsal of an arrangement of the portable type imaging devices 100 is described. The arrangement position of the portable type imaging devices 100 at an initial stage is planned on the parent device 200 side so as to cover ROI (Region Of Interest: region of interest) shown in the parent device 200 equally in the horizontal direction and the vertical direction in response to a photographic subject photographing mode. For example, at the time of a stage mode, an equal distance arrangement is made at 180 degrees in the horizontal direction and 45 degrees in the vertical direction with centering on the center of a stage. However, since each of the portable type imaging devices 100 has a basic autonomous action, such as collision avoidance, actually, it is not necessarily arranged at the same position as the initial plan of the parent device 200. At a time point when each of the portable type imaging devices 100 is placed stably, a temporary photography is performed. Then, the three-dimensional environment map and the position of each of the portable type imaging devices 100 are acquired by SLAM by the calculation in the parent device 200. In this connection, the accuracy of the position of each of the portable type imaging devices 100 may be increased by using a positioning system other than SLAM. In the parent device 200, by temporarily arranging the three-dimensional model of a photographic subject onto the three-dimensional environment map obtained by synthesizing video pictures from each of the portable type imaging devices 100, the amount of occurrence of occlusion and image quality are simulated from an obstacle, the position of each of the portable type imaging devices 100, light source information, and so on.

The mounting of this simulation and evaluation function can be realized by a rendering technique of the existing computer graphics, such as ray casting. In the case where the estimated amount of occurrence of occlusion has exceeded a certain threshold, an occurrence position is fatal, or a problem is expected in image quality, in order to improve it, choices are presented for a user.

As a presentation example, the following choices can be supposed.

(1) In the case where there is an obstacle between a photographic subject and a camera, proposed is to evade by shifting vertically or horizontally or approaching to a photographic subject.

(2) Proposed is to arrange with inclined distribution in the vicinity of a place where occurrence of occlusion is estimated, so as to minimize the occurrence of occlusion of a photographic subject.

(3) Proposed is to arrange so as to keep the image quality of a ROI considered as being important even in a photographic subject and so as to allow occlusion or image quality degradation in a ROI considered as being no important.

(4) Proposed is to add a camera so as to keep occlusion and quality all over the region.

(5) In the case of being unable to solve by all means, requested is for a user to correct a range of ROIs.

A user choices any of improvement proposals, and the parent device 200 corrects the arrangement plan on the basis of it. The procedures of arrangement plan-temporary photography-improvement proposals-improvement implementation as described in the above, are repeated until a user is satisfied.

Figure 11:
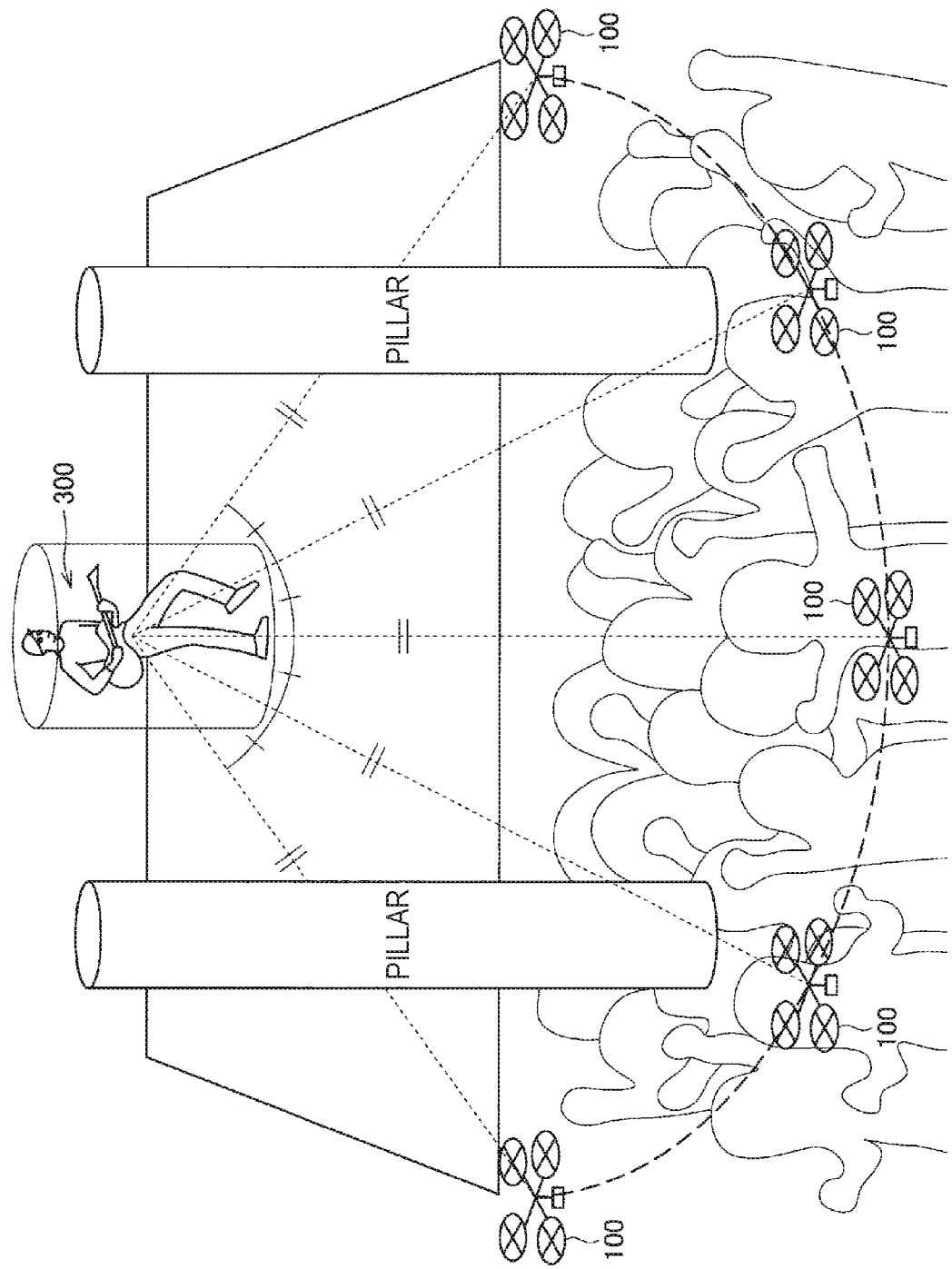
FIG. 11 is a schematic illustration showing an execution example of rearrangement in the case of a stage photography.
Figure 12:
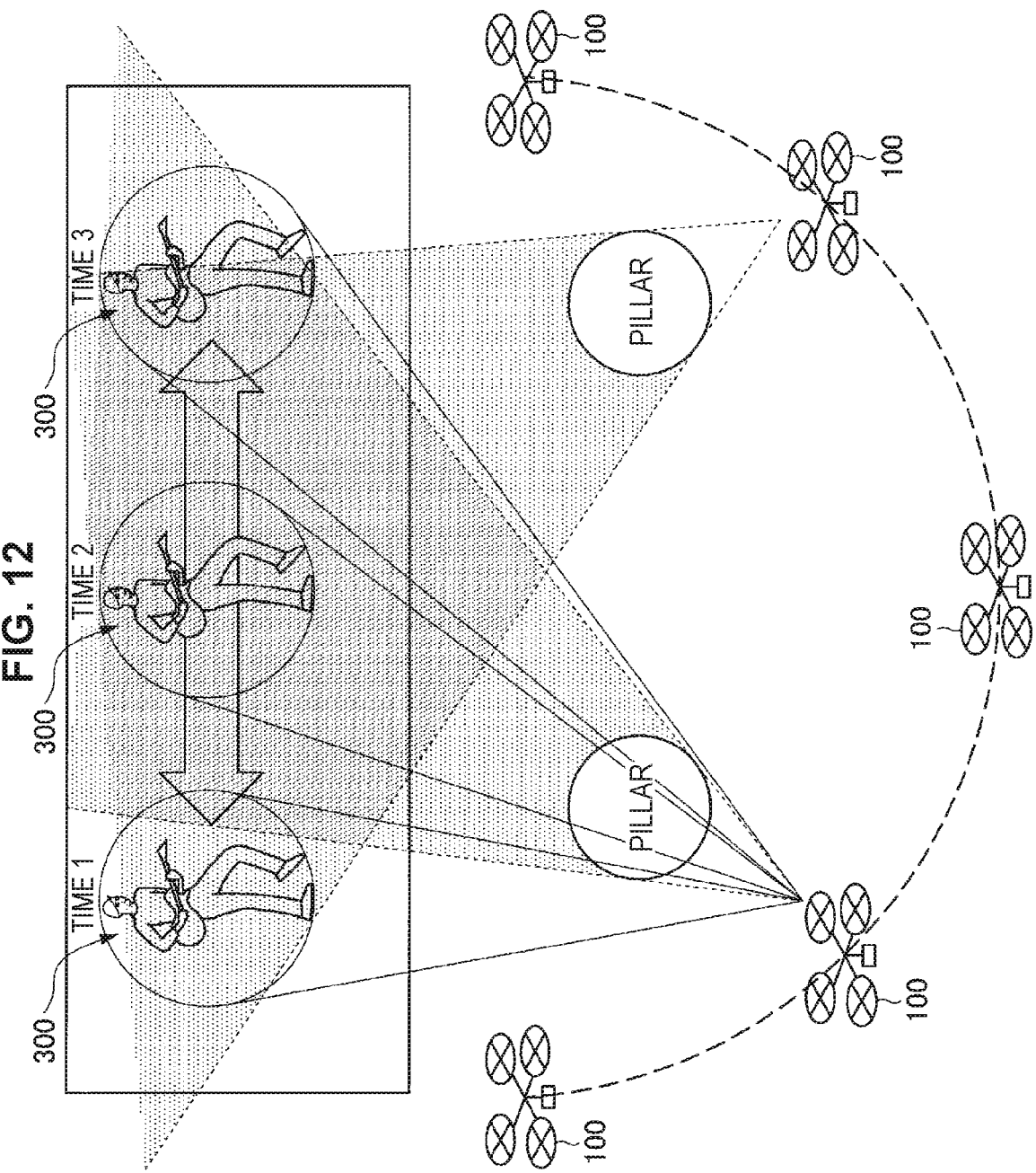
FIG. 12 is a schematic illustration showing an execution example of rearrangement in the case of a stage photography.

FIG. 11 through FIG. 14 show an execution example of rearrangement in the case of a stage photography. First, as shown in FIG. 11, by using the initial settings corresponding to a photographic subject photographing mode, a plurality of portable type imaging devices 100 is temporarily arranged with an equal interval and an equal distance with centering on the front of a ROI (a photographic subject 300). FIG. 12 shows a situation where the state shown in FIG. 11 is viewed from the above. As shown in FIG. 12, by arranging a three-dimensional model of the ROI on a reconstructed environment map, and by executing and evaluating ray casting from the position of each of the portable type imaging devices 100 while moving the model in a range that the movement of the ROI is estimated, the amount of occlusion and photography quality of the three-dimensional model are simulated.

Figure 13:
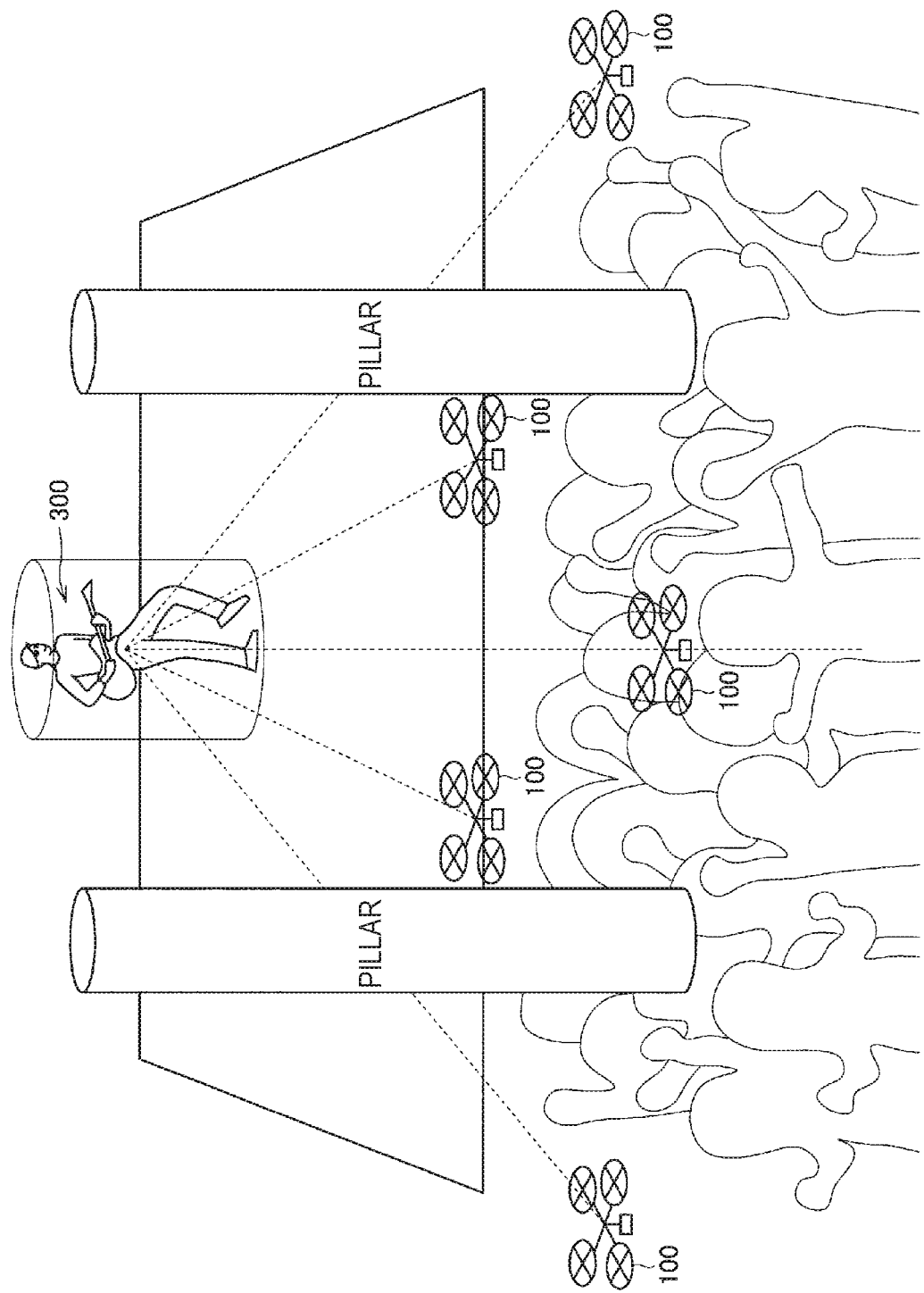
FIG. 13 is a schematic illustration showing an execution example of rearrangement in the case of a stage photography.

Then, as shown in FIG. 13, an optimized arrangement is performed on the basis of the simulation result of the amount of occlusion and the photography quality in the temporary photography. As shown in FIG. 11, in the state of the temporary arrangement, a part of the plurality of portable type imaging devices 100 cannot photograph the ROI, because a pillar becomes obstructive. For this reason, as shown in FIG. 13, by optimizing the arrangement of the portable type imaging devices 100 on the basis of the simulation result, it is made possible for all the portable type imaging devices 100 to photograph the ROI.

Figure 14:
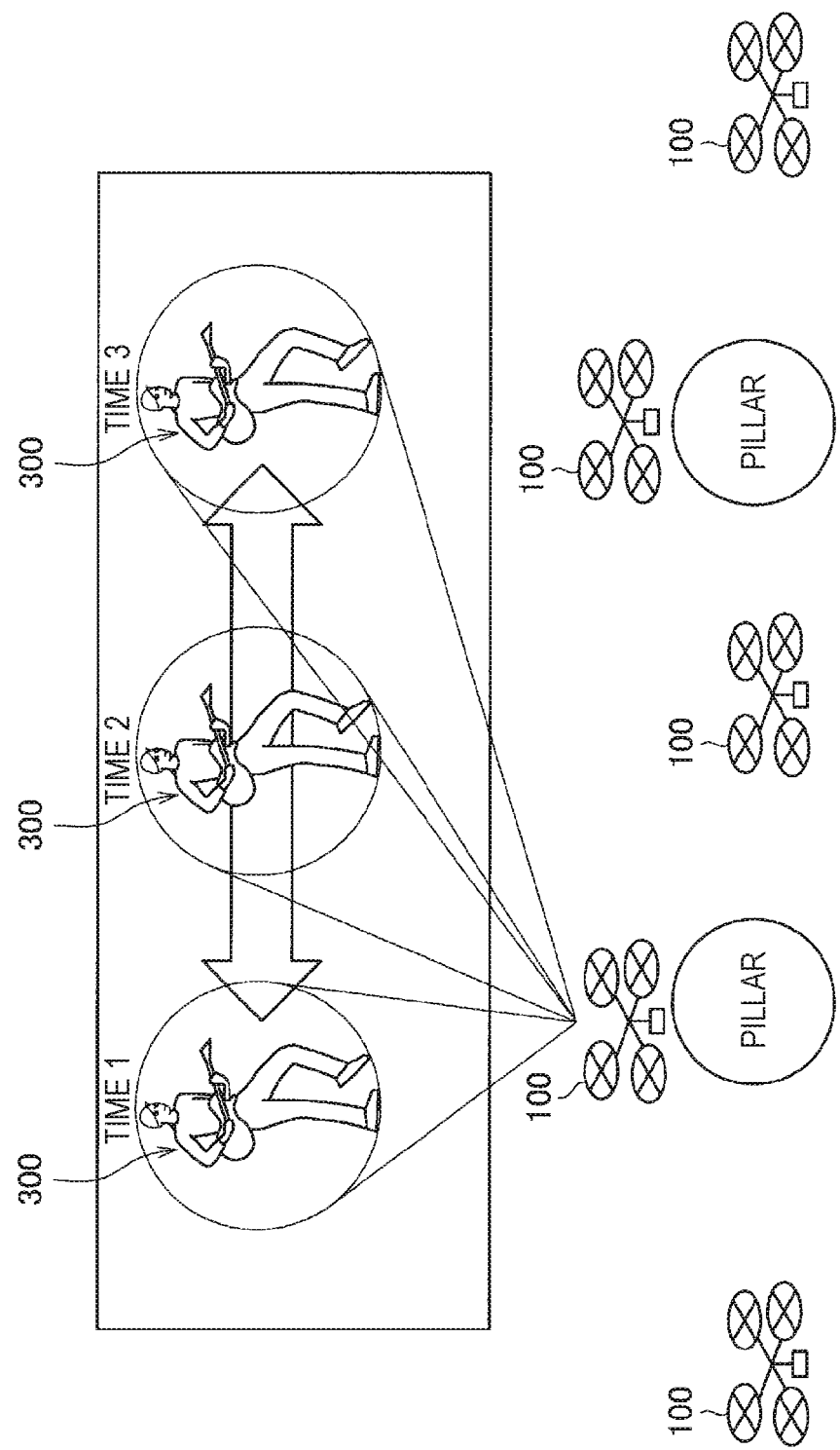
FIG. 14 is a schematic illustration showing an execution example of rearrangement in the case of a stage photography.

FIG. 14 shows a situation that the state shown in FIG. 11 is viewed from the above. In this way, with the rearrangement on the basis of the environment map of the temporary photography, it is possible to optimize the arrangement of the portable type imaging devices 100 so as to minimize an amount of occlusion while securing necessary quality.

6. About Actual Imaging

Next, actual imaging performed in Step S14 in FIG. 4 is described. In the actual imaging, the imaging device arrangement is finely adjusted from the free viewpoint video picture having been temporarily generated, and then the actual imaging is performed. The quality of the free viewpoint video picture generated with the current arrangement by the processing so far is confirmed, and then, in the case where there is a problem in the arrangement and the angle of view of the camera of the portable type imaging devices 100, an improvement plan is presented to a user. Drones etc. capable of performing an autonomous action are caused to be moved by themselves to the respective designated positions. The fine adjustment of the arrangement is performed, such as causing them to be arranged at a position where occlusion is not likely to occur or causing many cameras to be arranged at a place where the accuracy of depth sensing is low, on the basis of the free viewpoint video picture having been temporarily generated.

In the case of instructing a user to rearrange the portable type imaging devices 100, it may be permissible to indicate on a terminal used as the parent device 200, or an arbitrary terminal with a screen, and for a camera not equipped with a screen, a new arrangement position may be presented by a see-through HMD. Alternatively, it may be permissible to set with holding up a camera of a tablet to. About an instruction as to the new arrangement, a direction instructing which direction to move in is indicated for each of the portable type imaging devices 100. If there is a global map, the improvement plan may be indicated on the map. Depending on the case, there may be a case where, even if the system requests rearrangement, the arrangement cannot be changed, because there is a limitation in the installation positions of the portable type imaging devices 100. In this case, it is necessary to notify the system of a purport that the portable type imaging devices 100 cannot be moved. It is also effective that the system recognizes beforehand the difficulty in moving the portable type imaging device 100. Moreover, as an option of the rearrangement that moves a place, it may be permissible to cause the exchange of a lens and the change of zoom magnification to be performed in addition to the angle change. Moreover, in the case where network bandwidth becomes insufficient, an advice may be made so as to use cable connection. A plurality of spare cameras may be arranged, and a setting may be made so as to turn on and off dynamically. In this connection, until the free viewpoint video picture as expected is acquired, the rehearsal in Step S12 and the actual photography in Step S14 in FIG. 4 may be executed repeatedly.

The above is a basic process of the present embodiment. Next, with regard to the operations and the actions of the system during the photography, important points are described for each of items separately. First, in the case where it is not appropriate that camera crews etc. are reflected into during the photography, the photography can be stopped temporarily. Moreover, in the case where photographing with targeting a target, and in the case capable of obtaining feedback of audiences about the importance of each target from social media etc. while relaying video pictures to the outside, the importance of the target may be changed dynamically. As the feedback, used may be the information about viewing and listening, such as whether the user is viewing and listening a free viewpoint video picture with what kind of an angle of view, a position, and zoom. Here, even if it is attempted to specify a target object by collecting the angle-of-view information in the viewpoint of a user who is viewing and listening a free viewpoint video picture, in the case where a time stamp has deviated, it becomes impossible to distinguish which object. For this reason, in the case of receiving the feedback from the user, the information with regard to the viewing and listening time at a user's hand is also sent simultaneously.

In the case of photographing with targeting a target, it is permissible to change the settings of a camera so as to take with high definition a place where the target moves from now by estimating the movement of the target in advance, or to instruct the user to change the position of a camera.

7. In Case where Photographic Subjects Separate into Two or More and Move

In the case where a plurality of portable type imaging devices 100 tracks and photographs a photographic subject group, and in the case where the photographic subjects separate into two or more and move, cameras are distributed so as to track the respective photographic subjects, and photograph with separating into a plurality of groups. Moreover, in the case where the photographic subjects gather into one, the plurality of groups are merged and perform photography.

Figure 15:
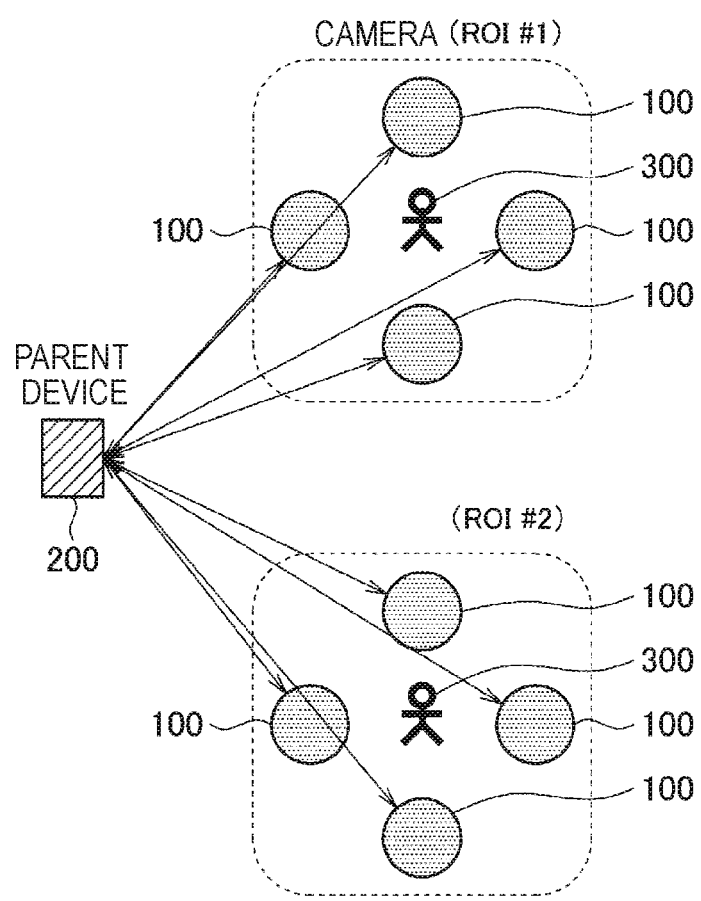
FIG. 15 is a schematic illustration showing a case where photographic subjects separate into two and move.
Figure 16:
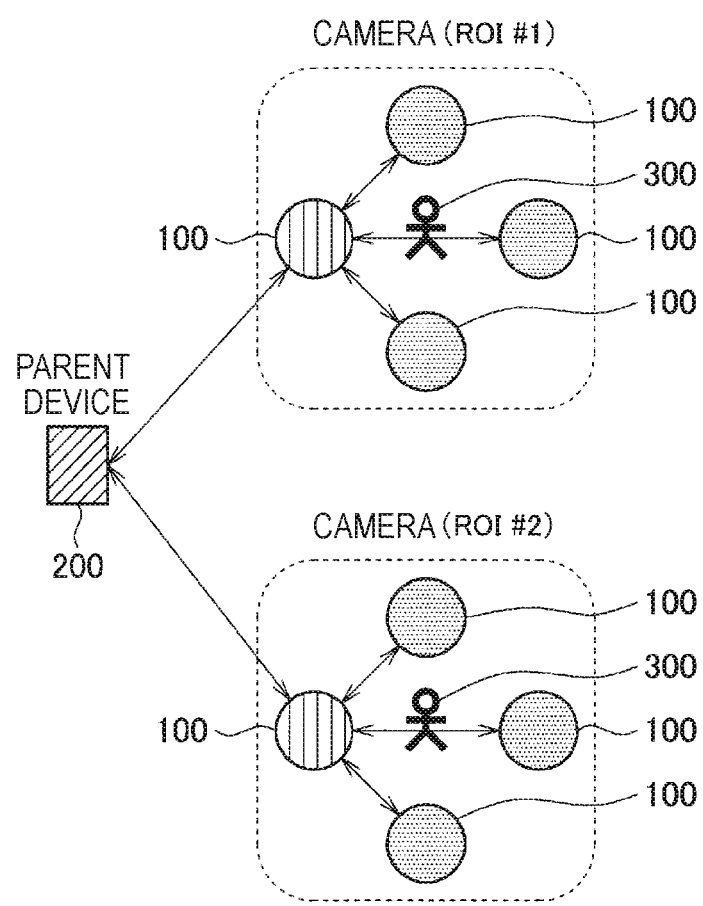
FIG. 16 is a schematic illustration showing a case where photographic subjects separate into two and move.
Figure 17:
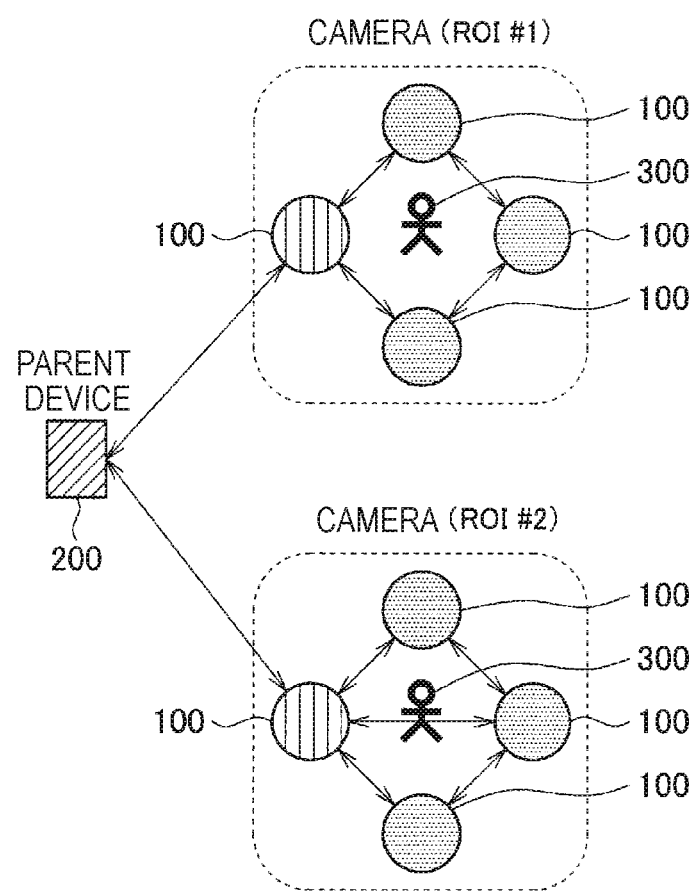
FIG. 17 is a schematic illustration showing a case where photographic subjects separate into two and move.

FIG. 15 through FIG. 17 each is a schematic diagram showing the case where photographic subjects separate into two and move and showing the case of imaging ROW and ROI #2. FIG. 15 shows a case where the parent device 200 and each of the portable type imaging devices 100 are connected via Wi-Fi Direct or Mesh connection. FIG. 16 shows an example where the portable type imaging device 100 having a master camera function among the plurality of portable type imaging devices 100 and the parent device 200 are connected with each other via Wi-Fi Direct or Mesh connection, and moreover, the portable type imaging device 100 having the master camera function is connected with each of the portable type imaging devices 100 via Wi-Fi Direct or Mesh connection. Moreover, FIG. 17 shows an example where the portable type imaging device 100 having a master camera function among the plurality of portable type imaging devices 100 and the parent device 200 are connected with each other via Wi-Fi Direct or Mesh connection, and each of the portable type imaging devices 100 is connected in a comprehensive manner with each of the portable type imaging devices 100 via Wi-Fi Direct or Mesh connection. As the portable type imaging device 100 having the master camera function, one device is set so as to correspond to ROI #1, and one device is set to so as to correspond to ROI #2. In FIG. 15 through FIG. 17, four portable type imaging devices 100 correspond to ROI #1 and four portable type imaging devices 100 correspond to ROI #2. However, if ROI #1 and ROI #2 gather to one, a total of eight portable type imaging devices 100 image ROI #1 and ROI #2.

In the case where ROI #1 and ROI #2 have separated from a gathering state, the photographic subject recognizing section 106 of each of the portable type imaging devices 100 recognizes such a matter and sends the imaging information including the position information with regard to the separated ROI #1 and ROI #2 to the parent device 100. The parent device 100 calculates arrangement information on the basis of the imaging information sent from each of the portable type imaging devices 100 and causes the plurality of portable type imaging devices 100 to be separated and arranged so as to correspond to each of ROI #1 and ROI #2. Moreover, in the case where ROI #1 and ROI #2 have gathered from the separating state, the photographic subject recognizing section 106 of each of the portable type imaging devices 100 recognizes such a matter and sends as the imaging information including the position information with regard to the gathered ROI #1 and ROI #2 to the parent device 100. The parent device 100 calculates arrangement information on the basis of the imaging information sent from each of the portable type imaging devices 100 and causes the plurality of portable type imaging devices 100 to be arranged so as to correspond to the gathered ROI #1 and ROI #2. In the case where each of the portable type imaging devices 100 tracks ROI #1 and ROI #2, each of the portable type imaging devices 100 can also generate a free viewpoint video picture for every predetermined time. In the case where each of the portable type imaging devices 100 includes a constitution corresponding to the imaging result determining section 210, the quality determining section 228, and the arrangement information calculating section 224 of the parent device 200, it becomes possible for each of the portable type imaging devices 100 to control the arrangement of each of the portable type imaging devices 100 dynamically in accordance with the quality of a free viewpoint video picture so as to decrease occlusion or the like as much as possible.

8. Processing Flow of Virtual Camera Path Setting and Verification with Using Free Viewpoint Video Picture by Temporary Imaging FIG. 18 is a flowchart showing a processing flow of virtual camera path setting and verification with using a free viewpoint video picture by temporary imaging. First, in Step S20, the portable type imaging devices 100 are temporarily arranged. The temporary arrangement is performed in response to a photographic subject imaging mode designated by a user with operating the user interface section 202. In the next Step S22, a rehearsal imaging (temporary imaging) is performed. In the next Step S24, images captured by each of the portable type imaging devices 100 in a state of having been temporarily arranged, are synthesized, and then, a free viewpoint video picture (temporary free viewpoint video picture) is generated. In the next Step S26, quality determination of the temporary free viewpoint video picture is performed. At the time of the quality determination, a three-dimensional model is used appropriately. As a result of the quality determination, feedback correction of the positions of the portable type imaging devices 100 having been temporarily arranged is performed. In the next Step S28, a virtual-camera path is set with the temporary free viewpoint video picture and a real camera, and verification is performed. On the basis of the verification result, the feedback correction is performed for the positions of the portable type imaging devices 100, and in order to generate a free viewpoint video picture, the portable type imaging devices 100 are arranged at the optimal positions. In the next Step S30, in the state where the portable type imaging devices 100 have been arranged at the optimal positions for generating a free viewpoint video picture, each of the portable type imaging devices 100 performs an actual photography. In the next step S32, on the basis of the image information acquired by the actual photography, images are synthesized, and a free viewpoint video picture is generated. In Step S32, on the basis of the verification result in Step S28, reflection of the virtual camera path information is performed.

As described in the above, according to the present embodiment, by making an imaging and sound collecting device for imaging a free viewpoint video picture have portability, it becomes possible for a content provider to increase and provide free viewpoint video picture content that the content provider could not photographed even though having wanted to photograph. Furthermore, for an end user, even if not having an installation technique or know-how with regard to an imaging device, it is possible to photograph and enjoy a free viewpoint video picture easily.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A control device of a movable type imaging device, including:

an imaging information acquiring section that acquires imaging information with regard to imaging from a plurality of movable type imaging devices having an imaging function; and an arrangement information calculating section that calculates arrangement information for arranging a plurality of the movable type imaging devices in order to generate a free viewpoint video picture by synthesizing an image imaged by a plurality of the movable type imaging devices on the basis of the imaging information.

(2)

The control device of a movable type imaging device according to (1), including:

a free viewpoint video picture generating section that generates the free viewpoint video picture by synthesizing an image imaged by a plurality of the movable type imaging devices; and a quality determining section that determines a quality of the free viewpoint video picture, in which the arrangement information calculating section calculates the arrangement information on the basis of a quality of the free viewpoint video picture.

(3)

The control device of a movable type imaging device according to (2), in which the arrangement information calculating section calculates the arrangement information on the basis of a quality of the free viewpoint video picture generated in a state where a plurality of the movable type imaging devices is temporarily arranged.

(4)

The control device of a movable type imaging device according to any of (1) to (3), including: a communication section that sends the arrangement information to a plurality of the movable type imaging devices in order to arrange a plurality of the movable type imaging devices on the basis of the arrangement information.

(5)

The control device of a movable type imaging device according to any of (1) to (4), including: a presenting section that presents the arrangement information for a user in order to arrange a plurality of the movable type imaging devices on the basis of the arrangement information.

(6)

The control device of a movable type imaging device according to (3), including: a communication section that sends temporary arrangement information for temporarily arranging a plurality of the movable type imaging devices, to the movable type imaging devices.

(7)

The control device of a movable type imaging device according to (6), in which the temporary arrangement information is prepared in advance in association with a photography condition of a photographic subject, including: a temporary arrangement information selecting section that selects the temporary arrangement information corresponding to the photography condition in response to an operation input of a user.

(8)

The control device of a movable type imaging device according to any of (1) to (7), in which the imaging information includes at least one of a position of a plurality of the movable type imaging devices, a specification of a camera that a plurality of the movable type imaging devices has, or an orientation of the camera.

(9)

The control device of a movable type imaging device according to any of (1) to (8), in which the imaging information includes a three-dimensional environment map generated from a captured image imaged by a plurality of the movable type imaging devices.

(10)

The control device of a movable type imaging device according to any of (1) to (9), in which in a case where one photographic subject has separated into plural, the arrangement information includes information for arranging by separating a plurality of the movable type imaging devices so as to correspond to a plurality of photographic subjects.

(11)

The control device of a movable type imaging device according to (10), in which in a case where a plurality of the photographic subjects has gathered into one, the arrangement information includes information for arranging a plurality of the movable type imaging devices around the gathered photographic subjects.

(12)

A control method of a movable type imaging device, including:

acquiring imaging information with regard to imaging from a plurality of movable type imaging devices having an imaging function; and calculating arrangement information for arranging a plurality of the movable type imaging devices in order to generate a free viewpoint video picture by synthesizing an image imaged by a plurality of the movable type imaging devices on the basis of the imaging information.

(13)

A program for making a computer function as:

a means for acquiring imaging information with regard to imaging from a plurality of movable type imaging devices having an imaging function; and a means for calculating arrangement information for arranging a plurality of the movable type imaging devices in order to generate a free viewpoint video picture by synthesizing an image imaged by a plurality of the movable type imaging devices on the basis of the imaging information.

REFERENCE SIGNS LIST 100 portable type imaging device
200 parent device
208 wireless communication section
212 free viewpoint video picture generating section
222 imaging information acquiring section
224 arrangement information calculating section
226 temporary arrangement information selecting section
228 quality determining section

The invention claimed is:

1. A control device of a movable type imaging device, comprising:
a central processing unit (CPU) configured to:
acquire first imaging information from a plurality of movable type imaging devices having an imaging function;
generate a free viewpoint video picture based on synthesis of a plurality of images of a photographic subject imaged by the plurality of movable type imaging devices,
wherein the plurality of images of the photographic subject is imaged based on the acquired first imaging information;
determine a quality of the generated free viewpoint video picture;
calculate first arrangement information based on the determined quality of the generated free viewpoint video picture,
wherein the calculated first arrangement information is for arrangement of the plurality of movable type imaging devices;
acquire, in a first case in which the photographic subject is separated into a plurality of photographic subjects, second imaging information including position information of the plurality of photographic subjects;
calculate second arrangement information based on the acquired second imaging information; and
control, based on the calculated second arrangement information, the plurality of movable type imaging devices such that the plurality of movable type imaging devices is separated into a plurality of groups of movable type imaging devices,
wherein the plurality of groups of movable type imaging devices corresponds to the plurality of photographic subjects.

2. The control device of the movable type imaging device according to claim 1, wherein the CPU is further configured to determine the quality of the generated free viewpoint video picture based on a state where the plurality of movable type imaging devices is temporarily arranged.

3. The control device of the movable type imaging device according to claim 1, wherein
the CPU is further configured to control transmission of the calculated first arrangement information to the plurality of movable type imaging devices, and
the plurality of movable type imaging devices is arranged based on the calculated first arrangement information.

4. The control device of the movable type imaging device according to claim 1, wherein the CPU is further configured to control presentation of the calculated first arrangement information to a user for the arrangement of the plurality of movable type imaging devices.

5. The control device of the movable type imaging device according to claim 2, wherein
the CPU is further configured to control transmission of temporary arrangement information to the plurality of movable type imaging devices, and
the temporary arrangement information is for temporary arrangement of the plurality of movable type imaging devices.

6. The control device of the movable type imaging device according to claim 5, wherein
the CPU is further configured to select the temporary arrangement information based on an operation input of a user, and
the temporary arrangement information corresponds to a photography condition of Rape photographic subject.

7. The control device of the movable type imaging device according to claim 1, wherein the acquired first imaging information includes at least one of a position of the plurality of movable type imaging devices, a specification of a camera of each of the plurality of movable type imaging devices, or an orientation of the camera.

8. The control device of the movable type imaging device according to claim 1, wherein the acquired first imaging information includes a three-dimensional environment map based on the plurality of images of the photographic subject.

9. The control device of the movable type imaging device according to claim 1, wherein the CPU is further configured to:
acquire, in a second case in which the plurality of photographic subjects is gathered at a same position, third imaging information including position information of the gathered plurality of photographic subjects;
calculate third arrangement information based on the acquired third imaging information; and
control, based on the calculated third arrangement information, the plurality of movable type imaging devices such that the plurality of movable type imaging devices is arranged around the gathered plurality of photographic subject.

10. A control method of a movable type imaging device, comprising:
acquiring first imaging information from a plurality of movable type imaging devices having an imaging function;
generating a free viewpoint video picture based on synthesis of a plurality of images of a photographic subject imaged by the plurality of movable type imaging devices,
wherein the plurality of images of the photographic subject is imaged based on the acquired first imaging information;
determining a quality of the generated free viewpoint video picture;
calculating first arrangement information based on the determined quality of the generated free viewpoint video picture,
wherein the calculated first arrangement information is for arrangement of the plurality of movable type imaging devices;
acquiring, in a case in which the photographic subject is separated into a plurality of photographic subjects, second imaging information including position information of the plurality of photographic subjects;
calculating second arrangement information based on the acquired second imaging information; and
controlling, based on the calculated second arrangement information, the plurality of movable type imaging devices such that the plurality of movable type imaging devices is separated into a plurality of groups of movable type imaging devices,
wherein the plurality of groups of movable type imaging devices corresponds to the plurality of photographic subjects.

11. A non-transitory computer-readable medium having stored thereon computer-executable instructions that, when executed by a control device of a movable type imaging device, cause the control device of the movable type imaging device to execute operations, the operations comprising:
acquiring first imaging information from a plurality of movable type imaging devices having an imaging function;
generating a free viewpoint video picture based on synthesis of a plurality of images of a photographic subject imaged by the plurality of movable type imaging devices,
wherein the plurality of images of the photographic subject is imaged based on the acquired first imaging information;
determining a quality of the generated free viewpoint video picture;
calculating first arrangement information based on the determined quality of the generated free viewpoint video picture,
wherein the calculated first arrangement information is for arrangement of the plurality of movable type imaging devices;
acquiring, in a case in which the photographic subject is separated into a plurality of photographic subjects, second imaging information including position information of the plurality of photographic subjects;
calculating second arrangement information based on the acquired second imaging information; and
controlling, based on the calculated second arrangement information, the plurality of movable type imaging devices such that the plurality of movable type imaging devices is separated into a plurality of groups of movable type imaging devices,
wherein the plurality of groups of movable type imaging devices corresponds to the plurality of photographic subjects.

* * * * *